United States Patent
Murakami et al.

(10) Patent No.: US 6,323,779 B1
(45) Date of Patent: Nov. 27, 2001

(54) DISPLACEMENT SENSING APPARATUS

(75) Inventors: Fumitada Murakami, Toyota; Osamu Kouketsu, Nishikamo-gun; Masanori Hirose, Okazaki, all of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/455,368

(22) Filed: Dec. 3, 1999

(30) Foreign Application Priority Data

Dec. 4, 1998 (JP) .................................................. 10-345932

(51) Int. Cl.$^7$ .................................................. G08B 21/00
(52) U.S. Cl. .................................. 340/686.3; 340/686.1; 340/671; 340/672; 340/479; 324/177; 324/160; 324/207.11; 324/207.12; 324/207.25; 73/132
(58) Field of Search .......................... 340/686.3, 686.1, 340/671, 672, 479; 324/177, 160, 207.25, 207.11, 207.12; 318/645, 638, 652, 568.22; 310/10, 40; 240/31; 73/121, 126, 129, 132

(56) References Cited

U.S. PATENT DOCUMENTS

| | | | | |
|---|---|---|---|---|
| 3,969,662 | * | 7/1976 | Weaver | 318/645 |
| 4,788,497 | * | 11/1988 | Katsumura | 324/177 |
| 4,922,274 | * | 5/1990 | Yamamoto et al. | 396/508 |
| 5,280,210 | * | 1/1994 | Kress et al. | 310/158 |
| 5,744,895 | * | 4/1998 | Seguchi et al. | 310/266 |
| 5,900,709 | * | 5/1999 | Kanda et al. | 318/652 |
| 6,268,722 | * | 7/2001 | Kogure et al. | 324/207.25 |

FOREIGN PATENT DOCUMENTS

| | | |
|---|---|---|
| HEI 5-107014 | 4/1993 | (JP) . |
| HEI 9-311012 | 12/1997 | (JP) . |

* cited by examiner

*Primary Examiner*—Benjamin C. Lee
(74) *Attorney, Agent, or Firm*—Kenyon & Kenyon

(57) ABSTRACT

A pedal stroke sensor a rotor that rotates with a brake pedal with a pair of brushes fixed on the rotor. The brushes are inclined oppositely to each other along rotating direction of the rotor and contact a circuit printed on a circuit board to generate output voltages V1A and V1B which increase and decrease oppositely to each other in response to the brushes sliding over the circuit board. A difference signal |V1A−V1B| is output as a signal corresponding to pedal stroke S of the brake pedal. When any kind of vibration changes the contacting positions of the brushes on the board, the output voltages V1A, V1B change in the same direction, so that, even if the contacting positions of the brushes change because of a vibration, the difference signal |V1A−V1B| does not change greatly, allowing accurate detection of the position of the brake pedal even if such vibrations occur.

18 Claims, 9 Drawing Sheets

US 6,323,779 B1

DISPLACEMENT SENSING APPARATUS

BACKGROUND OF THE INVENTION

1. Field of the Invention

This invention relates to a displacement sensing apparatus in general and more particularly to a displacement sensing apparatus which can output a signal corresponding to the position of a slider that can be slid or moved over a circuit board in response to the movement of any kind of a position-detectable part.

2. Description of the Related Art

A displacement sensing apparatus can be used to detect the position of a translatable or rotational part. Japanese Patent Application Laid-Open No. HEI 9-311012 shows one kind of such apparatus including a first slider and a second slider, both of which can slide over a circuit board. The first slider and the second slider are configured so as to maintain their angles to the circuit board. So, they can slide while keeping the angles.

A first voltage generating circuit generates a first output voltage corresponding to the position of the first slider on the circuit board. A second voltage generating circuit generates a second output voltage corresponding to the position of the second slider on the circuit board. A the second output voltage from the second voltage generating circuit tends to increase and decrease in the same manner as the first output voltage from the first voltage generating circuit. Based on both of the first and the second output voltages, the apparatus can detect the position of the rotational part.

However, the first slider and the second slider may be influenced by various kinds of vibrations or forces from outside. This makes it makes it difficult for both the first and the second sliders to keep their configuration angles to the circuit board. In other words, it may happen that the configuration angles of both sliders become changed. And when the configuration angles are changed, the positions of both the first and the second sliders are consequently changed. Therefore, the first output voltage and the second output voltage can be influenced in such situations.

SUMMARY OF THE INVENTION

In order to improve accuracy of the displacement sensing apparatus even if a vibration or another force from the outside influences the sliders, the directions in which the first and the second output voltages are biased in such situations are made opposite. And, the output voltages are logically processed to decrease such kind of influences on the detected position.

DETAILED DESCRIPTION

Figure 1:
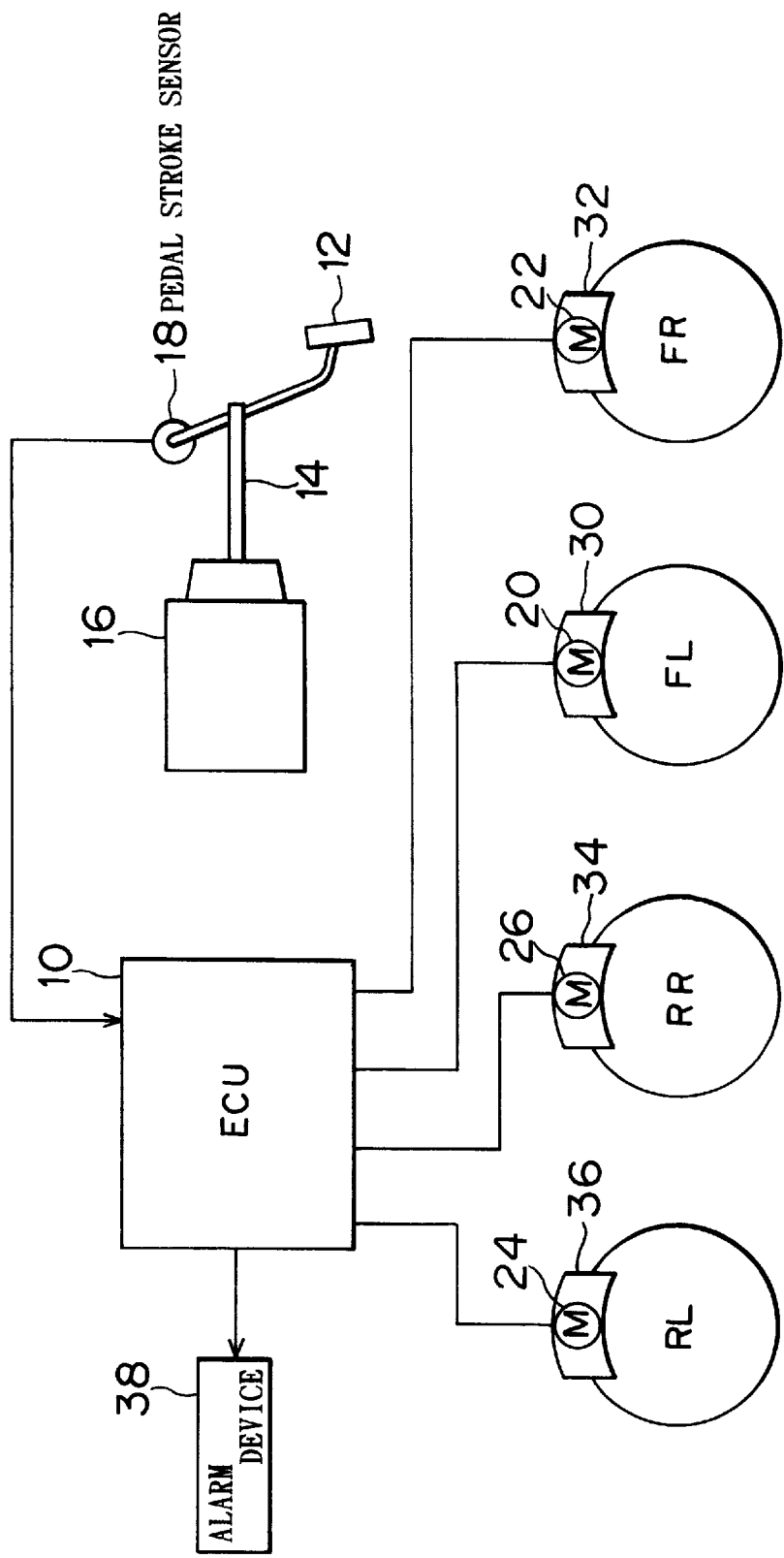
FIG. 1 is schematic diagram of an electric braking system utilizing an embodiment of a brake-pedal stroke sensor according to the displacement sensing apparatus of the present invention.

A first embodiment of the present invention is described below by referring to FIG. 1 through FIG. 8. FIG. 1 is a schematic diagram of an electric braking system for a vehicle utilizing an embodiment of a brake-pedal stroke sensor according to the displacement sensing apparatus of the present invention. The electric braking system has an electric control unit (ECU) 10. The electric braking system generates a braking force corresponding to a brake-pedal stroke by being controlled by the ECU 10.

A brake pedal 12, supported for rotation on a vehicle body, can rotate about its axis within a predetermined angle. The brake pedal 12 is connected with a stroke simulator 16 via a connecting rod 14. When the brake pedal is depressed, the connecting rod 14 plunges into the stroke simulator 16. The stroke simulator 16 generates a reacting force proportional to the plunging depth of the connecting rod 14. Therefore, the reacting force, responding to a brake pedal stroke S, acts on the brake pedal 12 when it is depressed.

There is a pedal stroke sensor 18 near a part of the vehicle body where the brake pedal 12 is attached. The pedal stroke sensor 18 electrically generates an output signal corresponding to the rotation angle of the brake pedal 12. The output signal from the pedal stroke sensor 16 is provided to the ECU 10. The ECU 10 detects the pedal stroke S of the brake pedal 12 based on the output signal.

The ECU 10 is connected to each of a plurality of brake motors 20, 22, 24, and 26 configured at each of the wheels FL, FR, RL and RR. The ECU 10 provides the brake motors 20, 22, 24 and 26 with an instruction signal corresponding to the brake pedal stroke S. The brake motors 20, 22, 24 and 26 are driven rotationally based on the instruction signal. Each of a plurality of disc brakes 30, 32, 34, and 36 is driven by a corresponding brake motor 20, 22, 24, or 26. The disc brakes can provide their braking forces in response to the brake motor 20, 22, 24, and 26.

Thus, the ECU 10 can detect the braking force, which is requested by a driver, based on the pedal stroke S when the brake pedal is depressed. The brake motors 20, 22, 24, and 26 are controlled in order to brake the vehicle with an actual braking force the same as the braking force requested by the driver. Therefore, in each instance, the electric braking system of this embodiment can provide a braking force, based on the pedal stroke S, to the each wheel.

The ECU 10 is connected to an alarm device 38. When the brake pedal sensor 18 is out of order, the ECU10 controls the alarm device 38 by control logic described later on and the driver can be notified of the problem.

Figure 2:
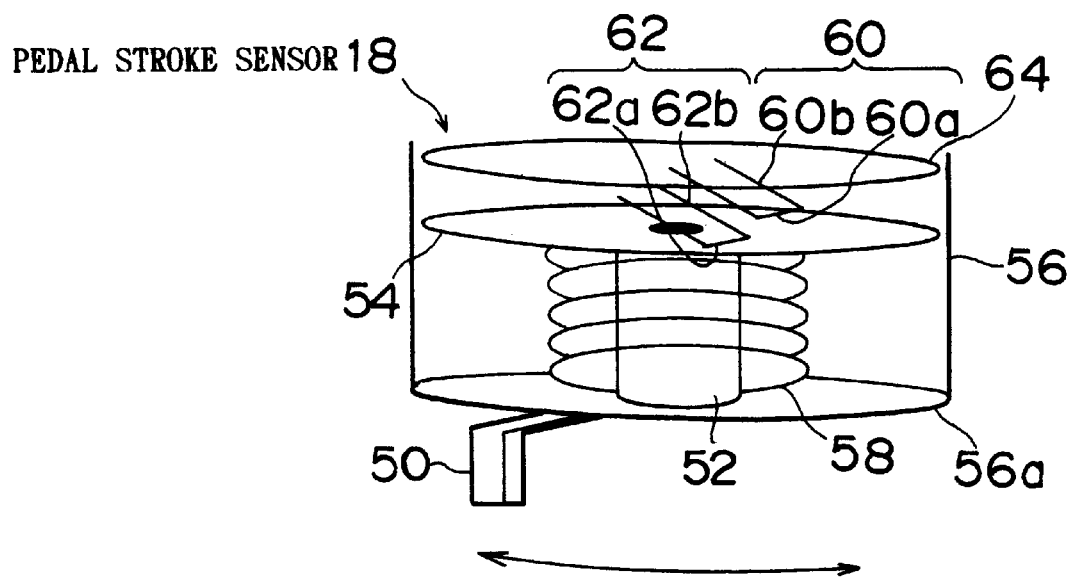
FIG. 2 is a schematic diagram of the brake-pedal stroke sensor according to the present invention.

FIG. 2 is a schematic diagram of the brake-pedal stroke sensor according to the present invention. The brake stroke sensor 18 has a rotating lever 50 connected to the brake pedal 12. A rotating shaft 52 is fixed on the rotating lever 50. The rotating shaft 52 can be rotated by an action of the rotating lever 50 with die brake pedal 12.

A rotor 54 is configured to be coaxial with the rotating shaft 52. The rotor 54 can be rotated with the rotating shaft 52. So, the rotor 54 is a movable piece. A cylindrical outer sleeve 56 is configured around the rotor 54 and the rotating shaft 52. The outer sleeve 56 supports the rotor 54. So, the outer sleeve 56 is a supporter. There is a spring 58 on a bottom part 56a of the outer sleeve 56. An upper part of the spring 58 is fixed to the rotor 54. The spring 58 can push the rotor 54 upward as seen in FIG. 2.

Two brushes 60 and 62 are fixed on the rotor 54. The brushes 60 and 62 are U-shaped and made of electrically conductive material. Each of the brushes 60 and 62 has a respective fixing part 60a or 62a and a sliding part 60b or 62b. The fixing parts 60a and 62a are fixed to the rotor 54. The sliders 60b and 62b can be slid over a circuit board described below. The sliders 60b and 62b of the brushes 60 and 62 are configured on the slant.

Figure 3:
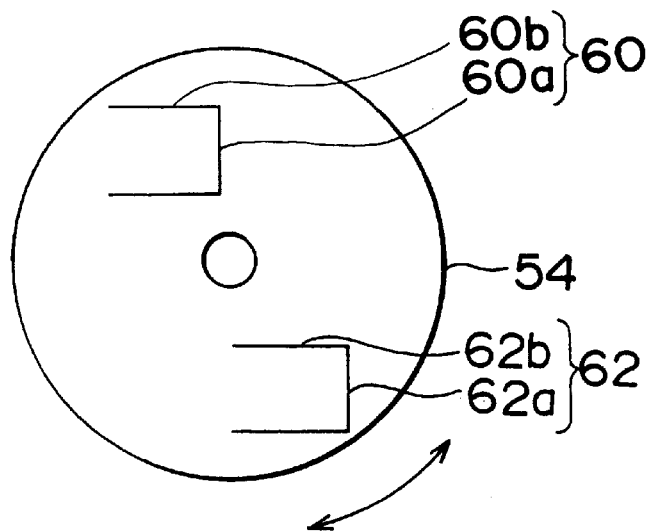
FIG. 3 is an upper view diagram of the brake-pedal stroke sensor especially showing the relation of a rotor and a brush.

FIG. 3 is plan view of the brake-pedal stroke sensor 18 especially showing the relation of the rotor 54 and the brushes 60 and 62. The slider 60b is disposed counterclockwise of the fixing part 60a. On the other hand, the slider 60a is disposed clockwise of the fixing part 62a. Therefore, with respect to rotating direction of the rotor 54, brushes 60 and 62 are configured in opposite slant directions to each other.

A circuit board 64 is disposed over the rotor 54 and fixed to the outer sleeve 56. The distance between the rotor 54 and the circuit board 64 is kept at a predetermined clearance by a spring 58 in order to make the sliders 60b and 62b easily slide over the board 64. When the predetermined clearance is kept, contacting points of the slider 60b and 62b to the board 64 are symmetric to each other with respect to the axis of the rotor 54.

Therefore, when the brake pedal 12 is depressed, the lever 50 rotates counterclockwise in FIG. 3. Then, the lever 50 makes the rotating shaft 54 rotate. So, the rotor 54 rotates in do same direction as of the rotating shaft 52, while the brushes 60 and 62 slide over the board 64. When the brake pedal 12 is released, the rotating lever 50 rotates clockwise in FIG. 3. In this situation, the rotor 54 also rotates clockwise while the brushes 60 and 62 slide.

Figure 4:
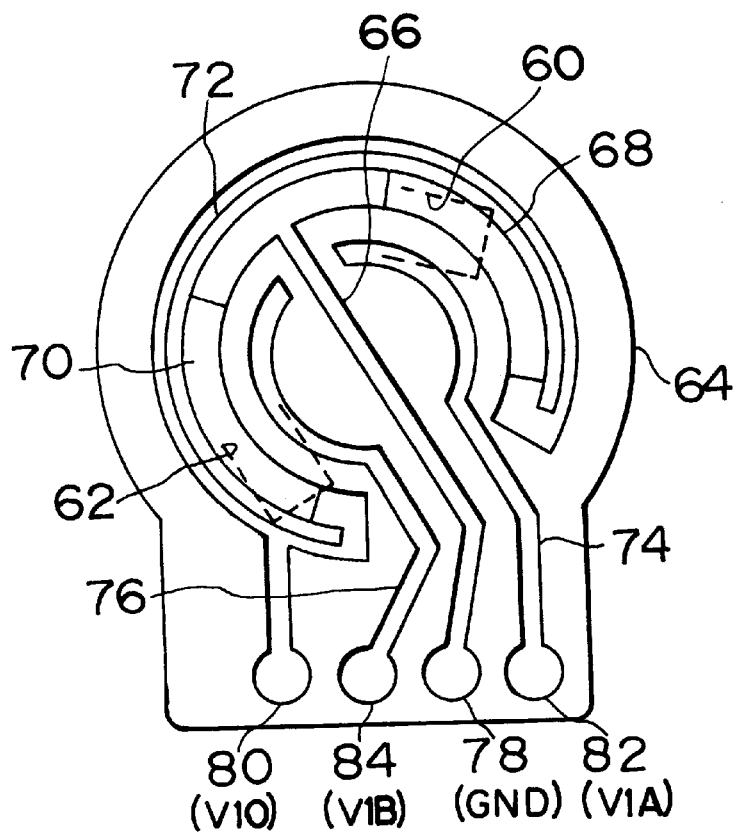
FIG. 4 is a circuit diagram of a brake-pedal stroke sensor of a first embodiment of the present invention circuit formed on a circuit board.

FIG. 4 is a circuit diagram of a circuit formed on the circuit board 64 of the brake-pedal stroke sensor 18. Included on the board 64 are a conductor 66, resistors 68 and 70, connected to the conductor 66, and another conductor 72 connected to the resistors 68 and 70. There are also conductors 74 and 76 on the board 64. The conductor 66 is connected to a ground terminal 78. The conductor 72 is connected to a power source terminal 80 to which power source voltage V10 is supplied. The conductor 74 is connected to a first output terminal 82. The conductor 76 is connected to a second output terminal 84. Both of the first and second output terminals are connected to the ECU 10.

Therefore, when the rotor 54 rotates, one side of the slider 60b contacts the resistor 68 and the other side of the slider 60b contacts the conductor 74 as the brush 60 slides over the board 64. An output voltage V1A, based on the contacting position of the brush 60, is impressed on the first output terminal 82. At the same time, one side of the slider 62b contacts the resistor 70 and the other side of the slider 62b contacts to the conductor 76 while the brush 62 slides over the board 64. A second output voltage V1B, based on the contacting position of the brush 62, is impressed on the second output tenninal 84. The brush 60 can slide around along the resistor 68. The brush 62 can slide around along the resistor 70.

When the brake pedal 12 is not depressed, the brush 60 contacts the end of the resistor 68 closer to the conductor 72, and the brush 62 contacts the end of the resister 70 closer to the conductor 66. In other word, when the brake pedal 12 is not depressed, each of the brushes 60 and 62 contacts the most clockwise end of its respective resistor 68 or 70 in FIG. 4. In this situation, the output voltage V1A of the first output terminal 82 is at the power source voltage V10, and the output voltage V1B of the second output terminal 84 is kept at zero volts.

When the brake pedal is then depressed, the brushes 60 and 62 start rotating counterclockwise while contacting the resistors 68 and 70 in FIG. 4. Then the contacting positions of both brushes 60 and 62 with the resistors 68 and 70 are moved. While being moved, the output voltage V1A decreases from V10 and the output voltage V1B increases from 0(zero) volts. Thus, in this embodiment, the output voltages V1A and V1B change in opposite directions, increasingly or decreasingly, with respect to each other while the brushes 60 and 62 slide over the board 64.

The brushes 60 and 62 can rotate and slide continuously until the brake stroke S of the brake pedal 12 reaches to a predetermined stroke S0. When the brake stroke S reaches to the predetermined stroke S0, the brush 60 is contacts the end of the resistor 68 closer to the conductor 66, and the brush 62 contacts the end of the resister 70 closer to the conductor 72. Then, the output voltage V1A becomes zero volts and the output voltage V1B reaches the power source voltage V 10.

Figure 5:
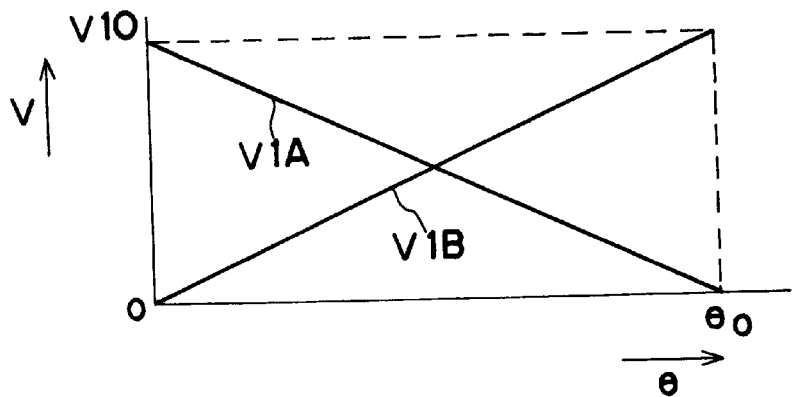
FIG. 5 is a graph of the first embodiment showing the relation of the brake-pedal stroke angle and two output voltages when in normal condition.

FIG. 5 is a graph showing the relation between the brake-pedal stroke S and output voltages V1A and V1B under normal conditions. As FIG. 5 shows, the output voltage V1A decreases in response to an increase of the pedal stroke S. When the stroke S reaches the predetermined stroke S0, the output voltage V1A becomes zero volts. Also, the output voltage V1B increases in response to an increase of the pedal stroke S. When the stroke S reaches S0, the output voltage V1B becomes the power source voltage V10.

The output voltages V1A and V1B are supplied to the ECU10. The ECU 10 calculates an absolute value of the difference |V1A–V1B| between the V1A and the V1B. A signal corresponding to the difference | V1A–V1B | is output as a signal representing the brake stroke S. So, the signal representing the brake stroke S is obtained accurately based on the difference of two output voltages.

It is possible that the pedal stroke sensor 18 will be vibrated because a vibration from the road through a vehicle body structure or the like. When such a vibration occurs to the stroke sensor 18, the rotor 54 supported rotationally by the outer sleeve 56 start to vibrate axially because of the spring 58. If the rotor 43 vibrates axially, the distance between the rotor 54 and the board 64 changes with its vibration. As a result, it makes the slant angles of the brushes 60 and 62 fixed to the rotor 54 change. This, in turn, causes the contacting positions of the sliders 60b and 62b of the brushes 60 and 62 against the board 64 to be changed. This causes the output voltage V1A of the first output terminal 82 and the output voltage V1B of the second output terminal 84 to change.

Therefore, even if the pedal stroke S of the brake pedal 12 is kept in a constant position, the output voltages V1A and V1B that are input to the ECU 10 are changed when the pedal stroke sensor 18 is influenced by a vibration fom the road and so on.

Figure 6A:
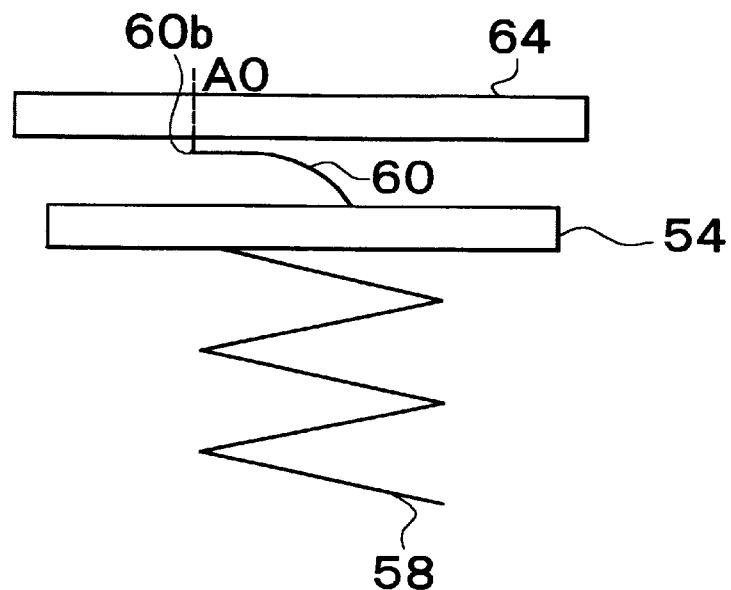
FIG. 6(A) is a schematic diagram showing the rotor and the circuit board when the clearance between the rotor and the circuit board is kept at a predetermined distance.
Figure 6B:
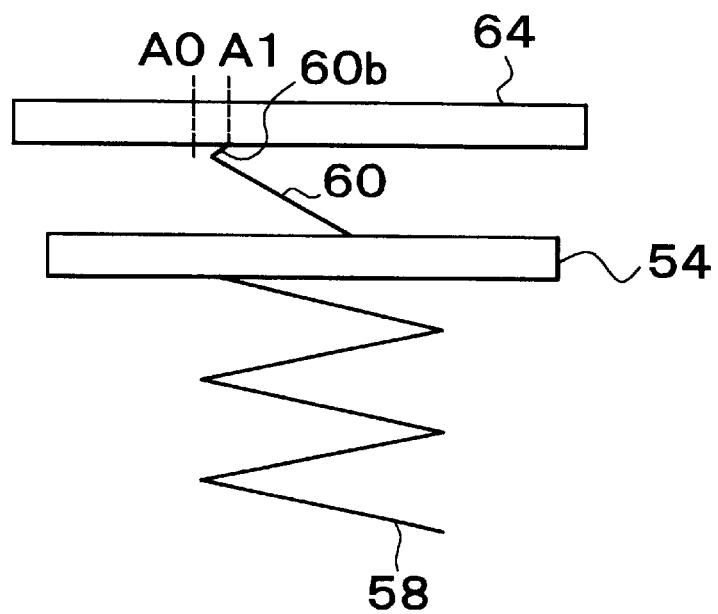
FIG. 6(B) is a schematic diagram showing the rotor and the circuit board when the clearance between the rotor and the board becomes larger.

FIG. 6(A) is a schematic diagram showing the rotor 54 and the circuit board 64 when the distance between the rotor 54 and the board 64 is kept at a predetermined distance. FIG. 6(B) is a schematic diagram of the rotor 54 and the circuit board 64 when the distance between the rotor 54 and the board 64 becomes larger. A position A0 denotes a contacting position of the slider 60b in a situation when the distance between the rotor 54 and the board 64 is kep at the predetermined distance. A position A1 denotes another contacting position of the slider 60b in another situation when the distance between the rotor 54 and the board 64 becomes larger.

When the vibration and so on makes the distance between the rotor 54 and the board 64 larger, as shown in FIG. 6(B), the brush 60 slides over the board 64. Then the contacting position of the slider 60b to the resistor 68 moves clockwise from the position A0 to the position A1 just as in FIG. 4. On the other hand, the contacting position of the slider 62b moves counterclockwise in FIG. 4, while brush 62 slides over the board 64.

Figure 7:
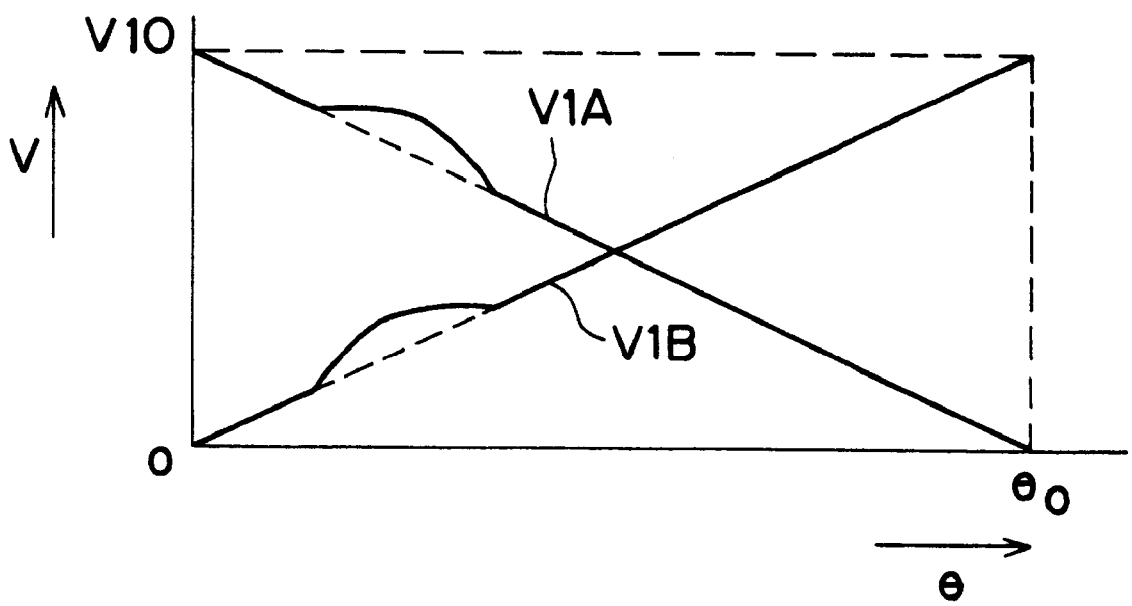
FIG. 7 is a graph of the first embodiment showing a relation of the brake-pedal stroke angle and two output voltages when the distance between the rotor and the board becomes larger.

FIG. 7 is a graph showing a relation of the brake-pedal stroke S and two output voltages V1A, V1B when the distance between the rotor 54 and the board 64 becomes larger. When the distance is made larger because of the vibration and so on, the output voltage V1A goes up more than expected. Also, the output voltage V1B goes up more than expected. When the distance is made smaller, each of the output voltages V1A, V1B becomes less than expected.

In this embodiment, the ECU 10 calculates the difference |V1A−V1B| between the V1A and the V1B and the signal corresponding to the difference | V1A−V1B | is output as a signal representing the brake stroke S as mentioned above. Even if these kinds of changes of the output voltages V1A and V1B occur, the difference |V1A−V1B| can exclude or reduce any influence of the changes. It means that any change of the difference |V1A−V1B| can be reduced or checked in such situations.

Therefore, an accurate signal corresponding to the actual pedal stroke S can be obtained even if the distance between the rotor 54 and the board 64 is changed by a vibration and so on. Because the braking force required by the driver can be detected accurately, the brake motors 20, 22, 24, and 26 can be controlled accurately and the proper braking force can be generated.

Figure 8:
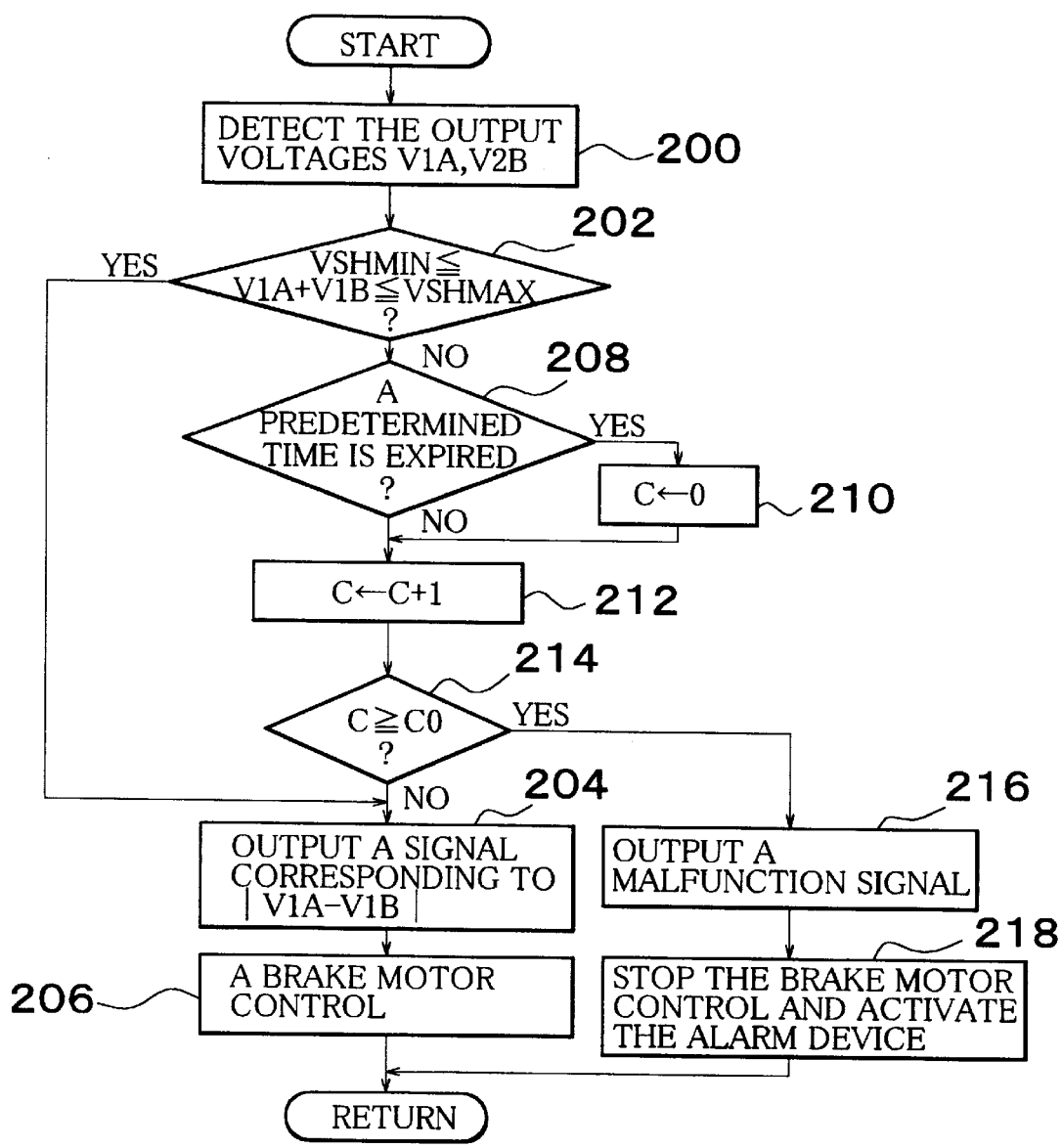
FIG. 8 is a flowchart illustrating the first embodiment of the method of the present invention to detect position.

In addition, it may happen that the output voltages V1A and V1B from the output terminal 82 and 84 change very frequently. This means the bushes 60 and 62 are not properly sliding over the board 64 and the pedal stroke sensor 18 seems to be out of order. The reason may be that the sensor 18 is not fixed very well. FIG. 8 is a flowchart illustrating a first embodiment of the method of the present invention to detect such abnormal situation, in addition to detecting an accurate pedal stroke S.

The steps of the flowchart in FIG. 8 are processed in the ECU 10 and started every time the process reaches the end of this flowchart. At first, step 200 detects the output voltage V1A from the first output terminal and the output voltage V1B from the second output terminal.

As described above, the output voltages V1A and V1B change in opposite directions each other while the brushes 60 and 62 slide over the board 64. So, when the output voltage V1A and the output voltage V1B are added up, summation of the voltage is usually kept at a constant value even as the brushes 60 and 62 slide over the board 64. When the distance between the rotor 54 and the board 64 is changed from the predetermined distance and both of the output voltages V1A and V1B change in the same direction, the summation of the output voltages V1A and V1B changes greatly from the constant value. Therefore, for example, when the output voltages V1A and V1B change because the pedal stroke sensor 18 is not fixed so well, the sunmnation of the output voltages V1A and V1B changes greatly from the constant value.

Next, step 202 calculates the summation of the output voltages V1A and VlB, and then compares the summation with both a minimum threshold voltage V SHMIN and a maximum threshold voltage V SHMAX. And the step 202 judges whether it is over the V SHMIN or it is under the V SHMAX. Both of the threshold voltages, the V SHMIN and the V SHMAX, can be defined around the power source voltage V10. Both minimum or maximum values are selected so as to be able to judge whether the pedal stroke sensor 18 is normal or not when the output voltages V1A and V1B change.

At the step 202, when V SHMIN$\leq$V1A+V1B$\leq$V SHMAX is satisfied, it is possible to judge that there is no great change in the output voltages V1A and V1B and that the pedal stroke sensor 18 is normal.

Next, step 204 calculates the difference |V1A−V1B| between the V1A and the V1B after step 200 detected V1A and the V1B. And then the signal corresponding to the difference |V1A−V1B| is output. In this step, a signal accurately corresponding to the pedal stroke S by the brake pedal 12 can be output while the output voltages V1A and V1B change because of any vibration and so on.

Step 206 controls the brake motor 20 in the normal situation, based on the signal output at the step 204. In detail, an instructing current is provided into the brake motor 20 in order to obtain a braking force corresponding to the signal out put at the step 204. After this, with step 206, the brake motor 20 is driven properly, and this routine is ended.

If V SHMIN$\leq$V1A+V1B$\leq$V SHMAX is not satisfied at step 202, it is possible to judge that there is a great change to the output voltages V1A and V1B. If such a situation continues for a predetermined length of time or frequently happens over a predetermined time, then it is possible to judge that the pedal stroke sensor 18 is not normal.

Next, step 208 judges whether the predetermined time is expired or not, after step 202 has been satisfied. If it is decided that the predetermined time is expired, then step 210 is processed. On the other hand, if it is not decided that the predetermined time is expired, then step 212 is processed.

Step 210 resets a counter C to zero. The counter C can be used to count how many times the step 202 is satisfied.

Next, step 212 increments the counter C. Then, the counter can count how many times step 202 was satisfied over the predetermined time.

Next, step 214 judges whether the number shown by the counter C reaches a constant C0. If C$\leq$C0 is not satisfied, then it can judge that the changes of the output voltages V1a and V1B is not so frequent over the predetermined time.

Then step 204 is processed. On the other hand, if C≦C0 is satisfied, then it can judge that the changes of the output voltages V1A and V1B are frequent over the predetermined time. In such a situation, then a step 216 is processed.

Next, step 216 outputs a malfunction signal. Step 218 stops controlling the brake motor 20 after the malfunction signal is received. In detail, it stops providing the instruction current to the brake motor 20. In addition to this, it can make the alarm device 38 activate. Then, the brake motor 20 is stopped and the alarm device 38 is on. After step 218, then this routine ends.

Therefore, following the flowchat of FIG. 8, the signal corresponding to the difference |V1A–V1B| between the V1A and the V1B can be output when the summation of the output voltages V1A and V1B is within such a predetermine range or not frequently out of the predetermined range over the predetermined time. The change of the difference |V1A–V1B| is reduced or checked even if the output voltages V1A and V1B are influenced by any vibration and so on. Therefore, while detecting the accurate pedal stroke S, the brake motor 20 can be controlled.

If the summation of the V1A and the V1B becomes frequently out of the predetermined range, the malinction signal can be output because it is possible to judge that the pedal stroke sensor 18 malfunctions. Therefore, if the pedal stroke sensor 18 is out of order, this embodiment can stop controlling the brake motor 20 and can notify the driver that the pedal stroke sensor 18 is out of order. The driver may be able to examine the pedal stroke sensor 18. This makes the control of the brake motor 20 more reliable.

The ECU 10 judges the malfunction of the pedal stoke sensor 18 based on the summation of the output voltage V1A and V1B. When the output voltages V1A and V1B change greatly in response to the change of the distance between the rotor 54 and the board 64, the summation V1A+V1B can be influenced by a combination of the change of the V1A and the change of the V1B. It is easier to judge a malfunction than it would be by making a judgment based on a change of either the output voltage V1A or V1B.

In order to get the signal corresponding to the pedal stroke S, it is also possible for the pedal stroke sensor 18 to include an inner circuit to calculate the difference between two output voltages and directly output the signal corresponding to the difference instead of doing it the above mentioned way.

It is also possible to design the pedal stroke sensor 18 such that the output voltages V1A and V1B change from a to V−α). The value α should be 0<α<V10. If either of the lines between the ECU 10 and the pedal stroke sensor 18 is disconnected or shorted, the output voltage which is input to the ECU 10 becomes V10 (max. voltage) or 0V. Therefore, it makes such disconnection or short easily distinguished from other kinds of malfunctions.

Figure 9:
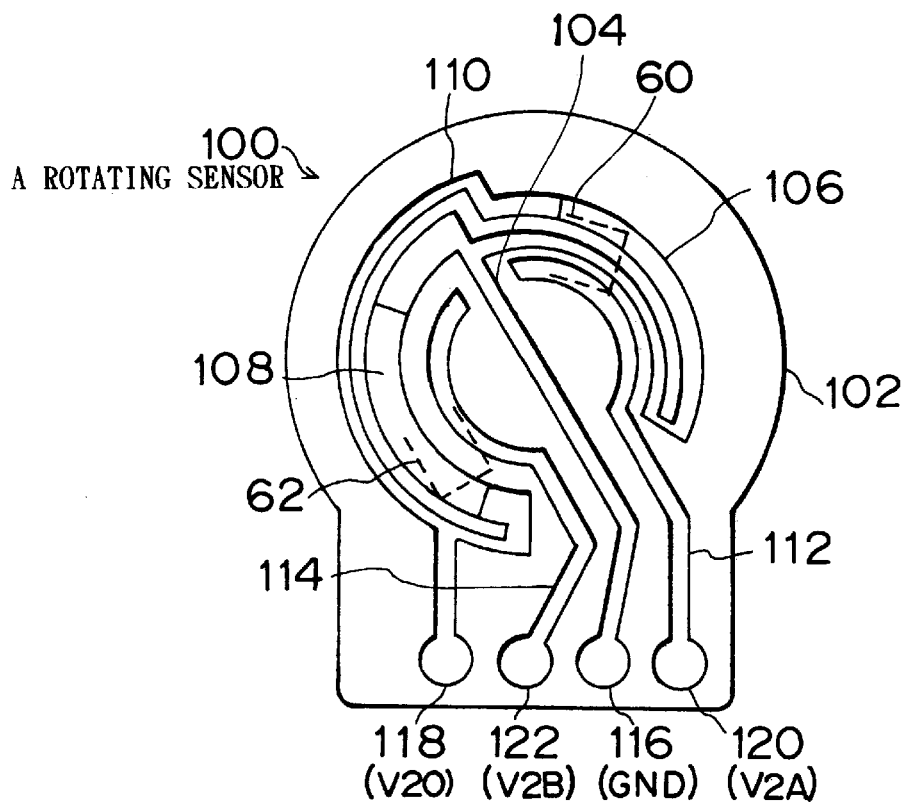
FIG. 9 is a circuit diagram of the circuit of the brake-pedal stroke sensor of a second embodiment of the present invention formed on a circuit board.

A second embodiment of the present invention is described below by referring to FIG. 9 through FIG. 12. FIG. 9 is a circuit diagram of a circuit formed on a circuit board 102 of a brake-pedal stroke sensor 100 of the second embodiment. The second embodiment uses the board 102 instead of the board 64 in FIG. 2. Also, it utilizes the flow chart of FIG. 12 for the ECU 10, instead of the first embodiment's flow chart described in FIG. 8. In describing the elements of FIG. 9, for those the same as those of FIG. 4, the same numbers as the FIG. 4 are assigned in FIG. 9.

As shown in FIG. 9, the circuit board 102 includes a conductor 104, resistors 106 and 108 connected to the conductor 104, and a conductor 110 connected to the resistors 106 and 108. There are also a conductor 112 and a conductor 114 on the board 102. The conductor 104 connects to a ground terminal 116. The conductor 110 connects to a power source terminal 118 to which power source voltage V20 is supplied. The conductor 112 is connected to a first output terminal 120. The conductor 114 is connected to a second output terminal 122. The output terminals 120 and 122 are connected to the ECU 10.

When the rotor 54 rotates, the brush 60 slides over the board 102 while one side of the slider 60b of the brush 60 keeps contact with the resistor 106. An output voltage V2A is impressed on the first output terminal 120, based on the contacting position of the brush 60. At the same time, one side of the slider 62b contacts to the resistor 108 while the brush 62 slides over the board 64. Impressed on the second output terminal 84 is an output voltage V2B based on the contacting position of the brush 62. The brush 60 can slide around along the resistor 106. The brush 62 can slide around along the resistor 108.

When the brake pedal 12 is released, the brush 60 contacts the end of the resistor 106 closer to the conductor 104, and the brush 62 contacts the end of the resister 108 closer to the conductor 104. (In other words, when the brake pedal 12 is not depressed, each of the brushes 60 and 62 contacts the most clockwise end of its resistor 68 or 70 in FIG. 4.) In this situation, the output voltage V2A of the fist output terminal 120 is kept at zero volts, and the output voltage V2B of the second output terminal 84 is kept at zero volts, too.

When the brake pedal is depressed after this, the contacting positions of both brushes 60 and 62 with the resistors 68 are 70 are moved. While being moved, the output voltage V2A increases from 0(zero) and the output voltage V2B increases from 0(zero) volts, too. When the pedal stroke S reaches to the predetermined pedal stroke S0, the brush 60 has moved to the end of the resistor 106 closer to the conductor 110. Also, the brush 62 has moved to the end of the resistor 108 closer to the conductor 110. Then, both of the output voltages V2A and V2B are at the power source voltage V20. Thus, in the second embodiment, the output voltage V2A tends to change similarly to the output voltage V2B while the brushes 60, 62 slide over the board 102.

Figure 10:
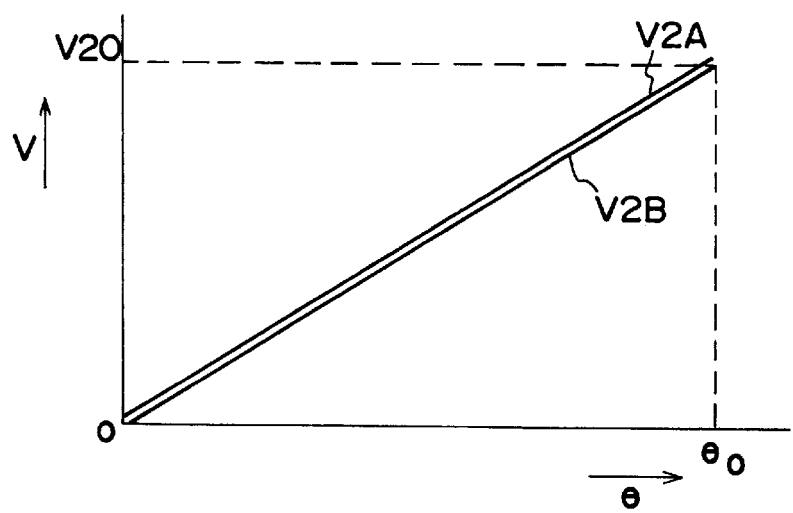
FIG. 10 is a graph of the second embodiment showing the relation of the brake-pedal stroke angle and two output voltages when in normal condition.

FIG. 10 is a graph showing the relation of the brake pedal stroke S and output voltages V2A and V2B when in normal condition. As FIG. 10 shows, the output voltage V2A of the first output terminal 120 increases in response to an increase of the pedal stroke S. When the stroke S reaches to the predetermined stroke S0, the output voltage V2A becomes the power source voltage V20. The output voltage V2B of the second output terminal 122 increases in response to an increase of the pedal stroke S, too. When the stroke S reaches the S0, the output voltage V2B also becomes the power source voltage V20.

The output voltages V2A and V2B are supplied to the ECU10. The ECU 10 calculates a summation V2A+V2B of V2A and V2B. A signal corresponding to the summation V1A+V1B is output as a signal representing the brake stroke S. So, the signal representing the brake stroke S is obtained accurately based on the summation of two output voltages.

Furthermore, when the rotor 43 vibrates axially because of any vibration from the road and so on, it may happen that the distance between the rotor 54 and the board 64 becomes larger than the predetermined distance. This makes the contacting positions of the brushes 60 and 62 over the board 102 change. In detail, the contacting position of the slider 60b over the resistor 106 moves clockwise in FIG. 9. On the other hand, the contacting position of the slider 62b moves counterclockwise, over the resistor 108, in FIG. 9.

Figure 11:
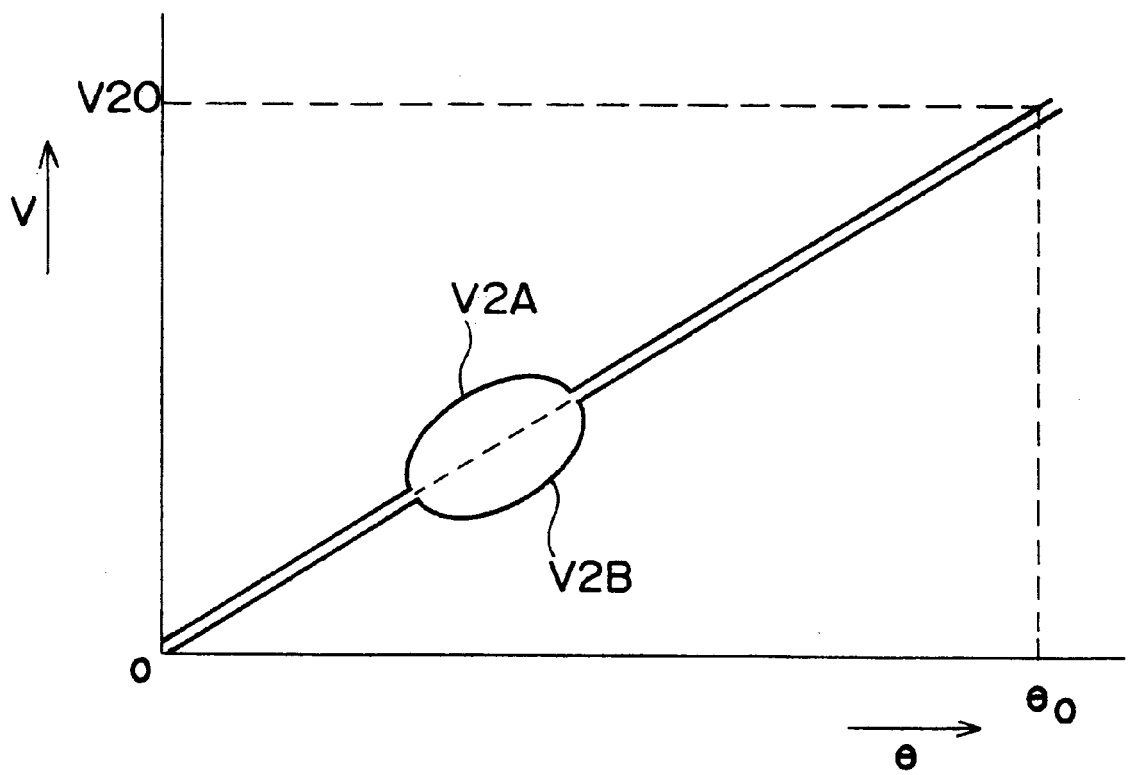
FIG. 11 is a graph of the second embodiment showing the relation of the brake-pedal stroke angle and two output voltages when the distance between the rotor and the board becomes larger.

FIG. 11 is a graph showing a relation of the brake-pedal stroke S and two output voltages V2A, V2B when the distance between the rotor 54 and the board 102 becomes larger. When the distance is made larger because of the vibration and so on, the output voltage V2A goes up more than expected. However, the output voltage V2B goes down more than expected. When the distance is made smaller, the output voltage V2A decreases and the output voltage V2B increases. In other words, changing directions of the output voltages V2A and V2B are opposite each other when such kind of vibration and so on occurs.

In this second embodiment, the ECU 10 calculates the summation V2A+V2B of the V2A and the V2B and the signal corresponding to the summation V1A+V1B is output as a signal representing the brake stroke S as mentioned above. Even if such kinds of changes of the output voltages V2A and V2B occur, the summation V2A+V2B can exclude or reduce any influence of the changes. This means any change of the summation V2A+V2B can be reduced or checked in such situations.

Therefore, in the same way as the first embodiment, an accurate signal corresponding to the actual pedal stroke S can be obtained even if the distance between the rotor 54 and the board 102 is changed by any vibration and so on. So, it can be expected to get the same effect from the second embodiment as is gotten from the first embodiment.

Note also that, when the sensor 100 is not fixed so well, it may happen that the output voltages V2A and V2B from the output terminals 120 and 122 are changed very frequently. In this situation, the brushes 60 and 62 can not properly slide over the board 102. Similarly to the first embodiment, it is preferable to detect such an abnormal condition and to encourage the driver to inspect the pedal stroke sensor 100. It may even be preferable not to control any brake motor 20.

Figure 12:
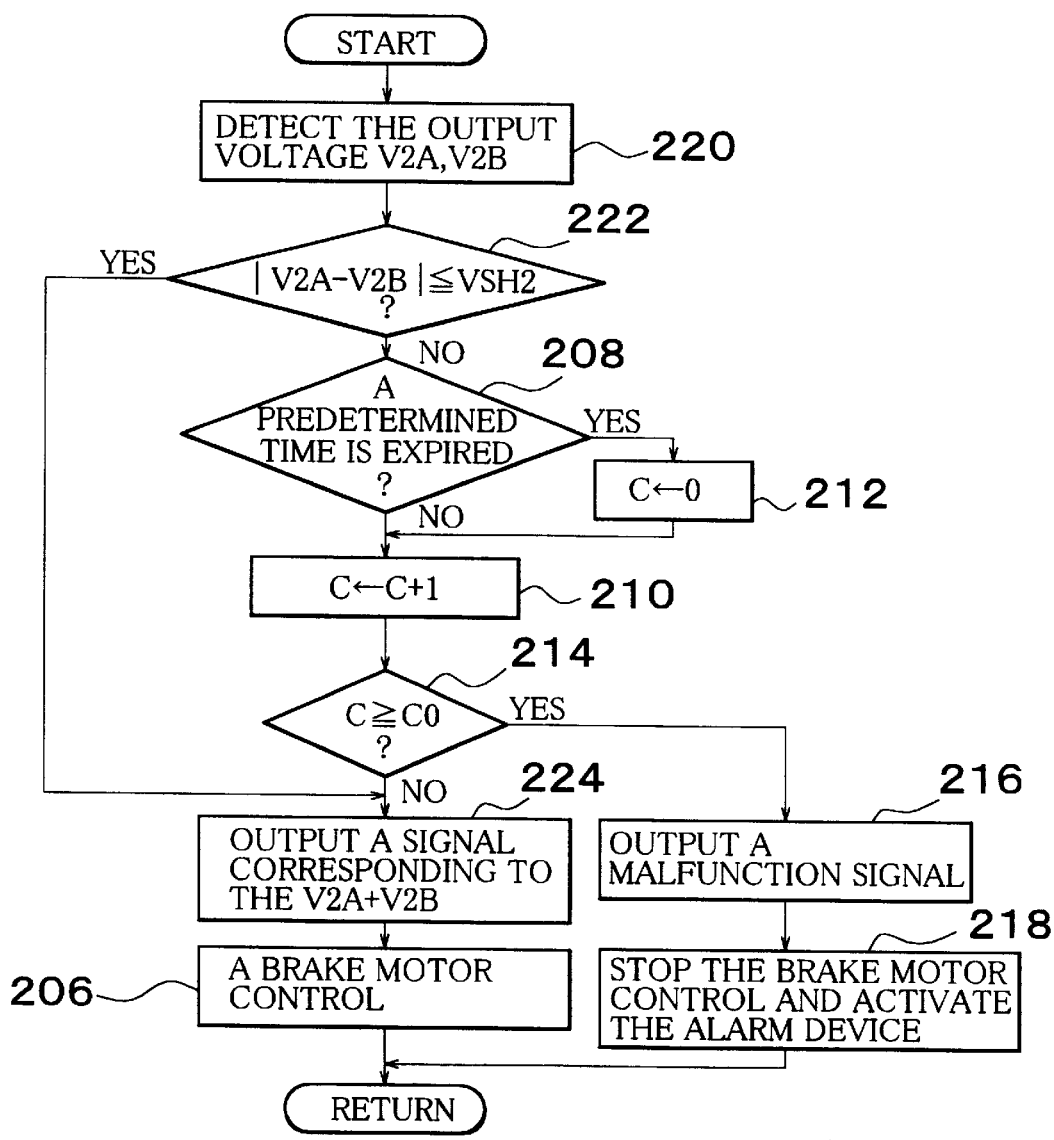
FIG. 12 is a flowchart illustrating the second embodiment of the method of the present invention to detect the position.

FIG. 12 is a flowchart illustrating such a controlling method for the second embodiment.

The steps of the flowchart in FIG. 12 are processed at the ECU 10 and restarted each time the end of this flowchart is reached. For steps that execute the same process as the flowchart of FIG. 8 in this FIG. 12, the same numbers are assigned.

At first, step 220 detects the output voltage V2A from the first output terminal 120 and the output voltage V2B from the second output terminal 122.

As described above, the output voltages V2A add V2B change in the same direction while the brushes 60 and 62 slide over the board 102. So, the difference |V2A−V2B| between the output voltages V2A and V2B is basically kept at zero volts even when the brushes 60 and 62 slide over the board 102.

When the distance between the rotor 54 and the board 102 is changed from the predetermined distance and both of the output voltages V2A and V2B change in opposite directions each other, the difference |V2A−V2B| becomes greater. Therefore, when the output voltages V2A and V2B change because, for example, the pedal stroke sensor 100 is not fixed so well, the difference |V2A−V2B| between the output voltages V2A and V2B changes increasingly or decreasingly from zero volts.

Next, step 222 calculates the difference |V2A−V2B| between the output voltages V2A and V2B, and then compares the difference with a threshold voltage VSH2. The threshold voltage VSH2 is defined to be a small enough number to judge whether the pedal stroke sensor 100 is normal or abnormal when the output voltages V2A and V2B change.

At the step 222, when the difference |V2A−V2B|≦V SH2 is satisfied, it is possible to judge that there is no great change in the output voltages V2A and V2B and that the pedal stroke sensor 100 is normal.

Next, step 224 calculates the summation V2A+V2B of V2A and V2B after step 220 detected V2A and the V2B. And then the signal corresponding to the summation V2A+V2B is output. By this step, a signal accurately corresponding to the pedal stroke S traversed by the brake pedal 100 can be output even while the output voltages V2A and V2B change because of any vibration and so on.

Step 206 controls the brake motor 20 in the normal situation, based on the signal output at the step 224. After this step 206, the brake motor 20 is driven properly, and this routine is ended.

If the difference |V2A−V2B|≦V SH2 is not satisfied at step 222, it is possible to judge that there is a great change in the output voltages V2A, V2B. If such a situation continues for a predetermined time or frequently happens over a predetermined time, then it is possible to judge that the pedal stroke sensor 100 is not normal. Then, steps 208 through 214 are processed.

If C≦C0 is not satisfied at step 214, then step 224 is processed. On the other hand, if C≦C0 is satisfied, then step 216 is processed. This routine ends after processing step 218.

The signal corresponding to the summation V2A+V2B can be output as the signal corresponding to the pedal stroke of the brake pedal, when the difference |V2A−V28| between the V2A and the V23 is zero volts or not frequently outside of the predetermined value within the predetermined time. The change of the summation V2A+V2B is reduced or checked even if the output voltages V2A and V2B are influenced by any vibration and so on. Therefore the second embodiment can obtain the same effect as the first embodiment.

If the difference |V2A−V2B| between V2A and V2B frequently becomes out of the predetermined range, a malfunction signal can be output because it is possible to judge the pedal stroke sensor 100 has malfunctioned. Therefore, if the pedal stroke sensor 100 is out of order, this embodiment can stop controlling the brake motor 20 and can notify the driver that the pedal stroke sensor 18 is out of order as in the first embodiment.

The ECU 10 judges a malfunction of the pedal stroke sensor 100 based on the difference between the output voltages V2A and V2B. When the output voltages V1A and V1B change greatly in response to the change of the distance between the rotor 54 and the board 64, the difference |V2A−V2B| can be influenced by a combination the change of the V2A and the change of the V2B. It is easier to judge the malfunction than making a judgment based on a change of either the output voltage V2A or V2B.

In order to make the output voltages V2A and V2B increase or decrease similarly, other circuit board layout may also be acceptable.

As for the way of judging the malfunction of the pedal stroke sensor 18 or 100, it may be possible to compare the summation or the difference of two output voltages with any predetermined value instead of the way of the first and the second embodiment do it. Of course, other way of judging may be used.

Not only the brake pedal sensor 18 or 100 for the brake pedal 12, but also other kinds of stroke sensors or rotation sensor (for example, throttle valve rotation angle sensor) can utilize this invention.

What is claimed is:

1. A displacement sensing apparatus comprising:
   a circuit board,
   a first slider inclined against the circuit board with a first inclination angle,
   a second slider, inclined against the circuit board with a second inclination angle which is opposite that of the first inclination, along a sliding direction of the first and the second sliders, both said first and second sliders disposed to slide over the circuit board in response to the displacement of an object,
   a first signal generator generating a first signal in response to a position of the first slider,
   a second signal generator generating a second signal that increases and decreases in a direction opposite to the first signal in response to the second slider,
   a processor configured to output a signal based on the difference between the first signal and the second signal.

2. A displacement sensing apparatus as in claim 1, and further comprising:
   a malfunction detector configured to detect a malfunction of the displacement sensing apparatus based on the sum of the first signal and the second signal.

3. A displacement sensing apparatus as in claim 1 and further comprising:
   a movable piece configured to support the first slider and the second slider, and
   a supporter configured to support the movable piece for movement on the circuit board.

4. A displacement sensing apparatus as in claim 3, wherein:
   the movable piece is connected with a vehicle control pedal.

5. A displacement sensing apparatus as in claim 4, wherein said control pedal comprises:
   a brake pedal connected with the movable piece.

6. A displacement sensing apparatus comprising:
   a circuit board,
   a first slider inclined against the circuit board with a first inclination angle,
   a second slider, inclined against the circuit board with a second inclination angle which is opposite that of the first inclination, along a sliding direction of the first and the second sliders, both said first and second sliders disposed to slide over the circuit board in response to the displacement of an object,
   a first signal generator generating a first signal in response to a position of the first slider,
   a second signal generator generating a second signal that increases and decreases in the same direction as the first signal in response to the second slider,
   a processor configured to output a signal based on the sum of the first signal and the second signal.

7. A displacement sensing apparatus as in claim 6, and further comprising:
   a malfunction detector configured to detect a malfunction of the displacement sensing apparatus based on the difference between the first signal and the second signal.

8. A displacement sensing apparatus as in claim 6 and further comprising:
   a movable piece configured to support the first slider and the second slider, and
   a supporter configured to support the movable piece for movement on the circuit board.

9. A displacement sensing apparatus as in claim 8, wherein:
   the movable piece is connected with a vehicle control pedal.

10. A displacement sensing apparatus as in claim 9, wherein said control pedal comprises:
    a brake pedal connected with the movable piece.

11. A displacement sensing apparatus comprising:
    a circuit board,
    a first slider inclined against the circuit board with a first inclination angle, a second slider, inclined against the circuit board with a second inclination angle which is opposite that of the first inclination, along a sliding direction of the first and the second sliders, both said first and second sliders disposed to slide over the circuit board in response to the displacement of an object,
    a first signal generator generating a first signal in response to a position of the first slider,
    a second signal generator generating a second signal that increases and decreases in a direction opposite to the first signal in response to the second slider,
    a malfunction detector configured to detect a malfunction of the displacement sensing apparatus based on the sum of the first signal and the second signal.

12. A displacement sensing apparatus as in claim 11 and further comprising:
    a movable piece configured to support the first slider and the second slider, and
    a supporter configured to support the movable piece for movement on the circuit board.

13. A displacement sensing apparatus as in claim 12, wherein:
    the movable piece is connected with a vehicle control pedal.

14. A displacement sensing apparatus as in claim 13, wherein said control pedal comprises:
    a brake pedal connected with the movable piece.

15. A displacement sensing apparatus comprising:
    a circuit board,
    a first slider inclined against the circuit board with a first inclination angle, a second slider, inclined against the circuit board with a second inclination angle which is opposite that of the first inclination, along a sliding direction of the first and the second sliders, both said first and second sliders disposed to slide over the circuit board in response to the displacement of an object,
    a first signal generator generating a first signal in response to a position of the first slider,
    a second signal generator generating a second signal that increases and decreases in the same direction as the first signal in response to the second slider,
    a malfunction detector configured to detect a malfunction of the displacement sensing apparatus based on a difference signal between the first signal and the second signal.

16. A displacement sensing apparatus as in claim 15 and further comprising:
    a movable piece configured to support the first slider and the second slider, and
    a supporter configured to support the movable piece for movement on the circuit board.

17. A displacement sensing apparatus as in claim 16, wherein:
    the movable piece is connected with a vehicle control pedal.

18. A displacement sensing apparatus as in claim 17, wherein said control pedal comprises:
    a brake pedal connected with the movable piece.

* * * * *